United States Patent
Keskes et al.

(10) Patent No.: US 6,628,806 B1
(45) Date of Patent: Sep. 30, 2003

(54) METHOD FOR DETECTING CHAOTIC STRUCTURES IN A GIVEN MEDIUM

(75) Inventors: Naamen Keskes, Pau (FR); Fabien Pauget, Pau (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/600,469

(22) PCT Filed: Nov. 3, 1999

(86) PCT No.: PCT/FR99/02679

§ 371 (c)(1),
(2), (4) Date: Jul. 17, 2000

(87) PCT Pub. No.: WO00/31687

PCT Pub. Date: Jun. 2, 2000

(51) Int. Cl.[7] .................................................. G06K 9/00
(52) U.S. Cl. ...................................... 382/109; 382/154
(58) Field of Search .............................. 382/109, 154, 382/254, 270, 274, 275; 348/85; 367/9, 14, 38, 60, 67, 72, 73; 702/14, 16, 17; 706/929

(56) References Cited

U.S. PATENT DOCUMENTS

| | | | | |
|---|---|---|---|---|
| 4,633,400 A | * | 12/1986 | Chittineni | 702/17 |
| 4,852,004 A | | 7/1989 | Manin | 702/17 |
| 4,910,716 A | * | 3/1990 | Kirlin et al. | 367/24 |
| 5,473,747 A | | 12/1995 | Bird et al. | 345/848 |
| 5,572,565 A | | 11/1996 | Abdel-Mottaleb | 378/37 |
| 5,892,732 A | * | 4/1999 | Gersztenkorn | 367/72 |
| 5,940,778 A | * | 8/1999 | Marfurt et al. | 702/16 |

FOREIGN PATENT DOCUMENTS

| | | | |
|---|---|---|---|
| FR | 2738871 | 3/1997 | E21B/49/00 |
| WO | 97/13166 | 4/1997 | G01V/1/30 |

OTHER PUBLICATIONS

D. Morris, "Coherence Cube Technology Adds Geologic Insight to 3-D Data", *World Oil*, vol. 218, No. 5, May 1, 1997, pp. 80–82.

* cited by examiner

*Primary Examiner*—Andrew W. Johns
*Assistant Examiner*—Shervin Nakhjavan
(74) *Attorney, Agent, or Firm*—Ostrolenk, Faber, Gerb & Soffen, LLP

(57) ABSTRACT

Method of detecting chaotic structures in a given medium.

It is of the type consisting in:

calculating the components of the light intensity gradient vector E at every point of a window F, centered on a point of a block representative of the medium, and it is characterized in that it furthermore consists in summing elementary matrices M for all the points of the window F, diagonalizing said sum matrix A so as to determine its eigenvalues $\lambda 1, \lambda 2, \lambda 3$, quantifying, at the center of the window, the minimum of the said eigenvalues $\lambda 1, \lambda 2, \lambda 3$, and with the constraint $U^T \times D = 1$, eliminating the contribution of the largest eigenvalue, defining a multidirectional error by integrating it in the plane defined by the eigenvectors corresponding to the remaining eigenvalues, assigning the multidirectional error to the image point on which the window F is centered, and calculating the multidirectional errors assigned to all the image points of the image block.

5 Claims, 3 Drawing Sheets

METHOD FOR DETECTING CHAOTIC STRUCTURES IN A GIVEN MEDIUM

The present invention relates to a method of detecting chaotic structures in a given medium.

A chaotic structure is a three-dimensional region of a medium inside which the variations in intensity between neighbouring pixels of an image are especially anarchic. Such regions, regarded as being chaotic, may appear in any three-dimensional imaging, such as for example in medical imaging, seismic imaging; in the case of seismic imaging, they pertain to channel complexes.

When a seismic block is visualized in a given direction, the channel complex or zone exhibits particularly disorganized movements. In order to detect or highlight the channel complex, it has been proposed that the error in the optical flux at every point be calculated according to a model in which the velocity vector field is assumed to be constant locally. When the abovementioned method of detecting the channel complexes is implemented, it is found that the points situated outside the channel complex correspond well to the model used, since locally they all undergo almost the same movement. In this case, the error in the optical flux, which represents the deviation between the velocity obtained and the ideal velocity which is a velocity corresponding to a zero error, is small. Conversely, the points situated inside the channel complex have very different movements locally and the assumption of a uniform field then becomes inadequate. Accordingly, the error in the optical flux, calculated in such a complex, is considerably bigger. Such a behaviour or such a difference between the calculated flux errors makes it possible very simply to distinguish the channel complexes in the form of three-dimensional regions. However, the optical flux calculation and the resulting monodirectional error remain dependent on the direction of visualization which is chosen arbitrarily. To obtain more robust detection of channel complexes, it would be possible to envisage calculating the flux error in a large number of directions. However, it would not be conceivable to average the calculated flux errors by displaying a seismic survey in all directions on account of prohibitive calculation time.

The manner of calculating the monodirectional flux error is given below.

Consider a block of seismic images whose axes are x, y, z with a direction of visualization which coincides with the z axis, the said direction of visualization being defined by the transposed vector $\Delta=[001]^T$ and the component of the local displacement U or optical flux in the direction $\Delta$ is unity. The model with constant velocity vector field estimates the transposed vector $U=[u,v,1]^T$ by minimizing the sum W below by the method of least squares:

$$W = \sum_{i \in F} (Ex_i u + Ey_i v + Ez_i)^2 \quad (1)$$

in which:

is a three-dimensional window with axes x, y, z, of dimensions N*N*N, N being the number of pixels of the image along each of the three axes x, y, z.

$Ex_i$, $Ey_i$, $Ez_i$ are the partial derivatives of the luminous intensity at the point i along the axes x, y and z.

The components u and v are calculated by the following formulae:

$$u = \frac{S_{xy}S_{yz} - S_{xz}S_{yy}}{S_{xx}S_{yy} - S_{xy}^2} \quad (2)$$

$$v = \frac{S_{xy}S_{xz} - S_{yz}S_{xx}}{S_{xx}S_{yy} - S_{xy}^2}$$

with:

$$Sxx = \sum_{i \in F} Ex_i^2 \quad (3)$$

$$Syy = \sum_{i \in F} Ey_i^2$$

$$Sxz = \sum_{i \in F} Ex_i Ez_i$$

$$Sxy = \sum_{i \in F} Ex_i Ey_i$$

$$Syz = \sum_{i \in F} Ey_i Ez_i$$

In the ideal case where the displacements of the pixels situated inside the window F are identical, that is to say when the constant-field model is entirely valid, the sum W is zero. In the perturbed cases of channel complexes, the displacements of the pixels situated inside the window F are different and then the sum W is non zero and it is in fact very big.

The purpose of the present invention is, on the one hand, to remedy the aforesaid drawbacks which reside in the fact that the calculation of the flux error is dependent on the direction of visualization and that calculating the error in all the directions of the seismic survey would be prohibitive, and on the other hand, to propose a method which makes it possible to detect chaotic structures in a reliable manner and with a considerably reduced calculation time.

The subject of the present invention is a method of detecting chaotic structures in a given medium, of the type consisting in:

a) representing the given medium by means of at least one sequence of images with axes x and y and arranged along a perpendicular axis z in such a way as to construct an image block with axes x, y and z, b) defining a three-dimensional analysis window F with axes parallel to the axes x, y and z, c) centering the window F on an image point of the block, d) calculating the components along the x, y and z axes of the light intensity gradient vector E at every point of the window F, characterized in that it furthermore consists in:

e) calculating an elementary matrix M at every point of the window F and representing the direct product $E \times E^T$ where $E^T$ is the transpose of the gradient vector E, f) summing the elementary matrices M for all the points of the window F, in such a way as to obtain a sum matrix A which is assigned to the said image point on which the window is centered, g) diagonalizing the said sum matrix A so as to determine its eigenvalues $\lambda_1$, $\lambda_2$, $\lambda_3$, each eigenvalue corresponding to an eigenvector, h) quantifying, at the image point, center of the window, the minimum global error in the optical flux vector U in an oriented direction with unit vector D, as a function of the said eigenvalues $\lambda_1$, $\lambda_2$ and $\lambda_3$ with the constraint $U^T \times D = 1$ where $U^T$ is the transpose of the vector U, i) eliminating the contribution of the largest eigenvalue in the quantification of the error in the optical flux in such a way as to obtain a quantification of a secondary error in the optical flux as a function of the two remaining eigenvalues for the said oriented direction;

j) defining a multidirectional error by integrating the secondary error in the plane defined by the eigenvectors corresponding to the remaining eigenvalues, k) assigning the multidirectional error to the image point on which the window F is centred, and l) calculating the multidirectional errors assigned to all the image points of the image block.

An advantage of the present invention resides in the fact that the calculated flux error is multidirectional, that is to say it is calculated in all the directions of a plane defined by the eigenvectors corresponding to the remaining eigenvalues.

According to another characteristic of the present invention, it is only necessary to determine the formula representative of the multidirectional error assigned to one image point and then to apply it in respect of the eigenvalues of each diagonalized matrix corresponding to each of the other image points of the block analysed.

In this way, the calculation time in respect of the entire set of image points is considerably reduced, thus making it possible to analyse ever larger and ever more complex seismic image blocks for example in times which are reasonable compared with those which are required for implementing the methods of the prior art.

According to another characteristic, the multidirectional errors are selected as a function of a threshold which can be determined or defined gradually, so that after having defined an appropriate threshold, the values of the multidirectional errors which are less than the said appropriate threshold are eliminated. Thus, the limits of the envelope determined by the points corresponding to a multidirectional error equal to the prescribed threshold, will correspond to the limits of the channel complex.

Other advantages and characteristics will become more clearly apparent on reading the description of an application of the method according to the invention to a block of seismic images, as well as the appended drawings in which.

Figure 1:
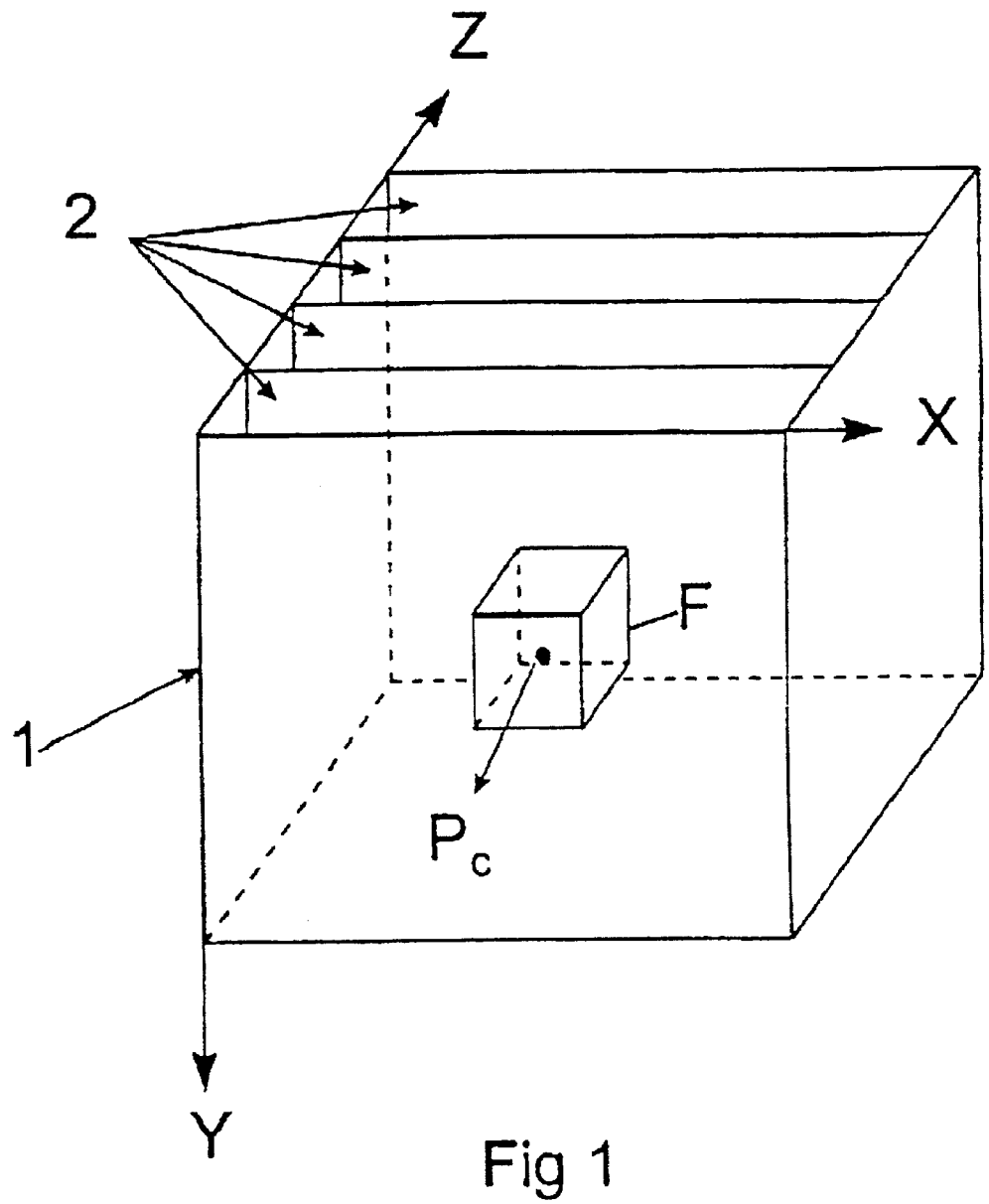
FIG. 1 is a schematic representation of a block of seismic images.
Figure 2:
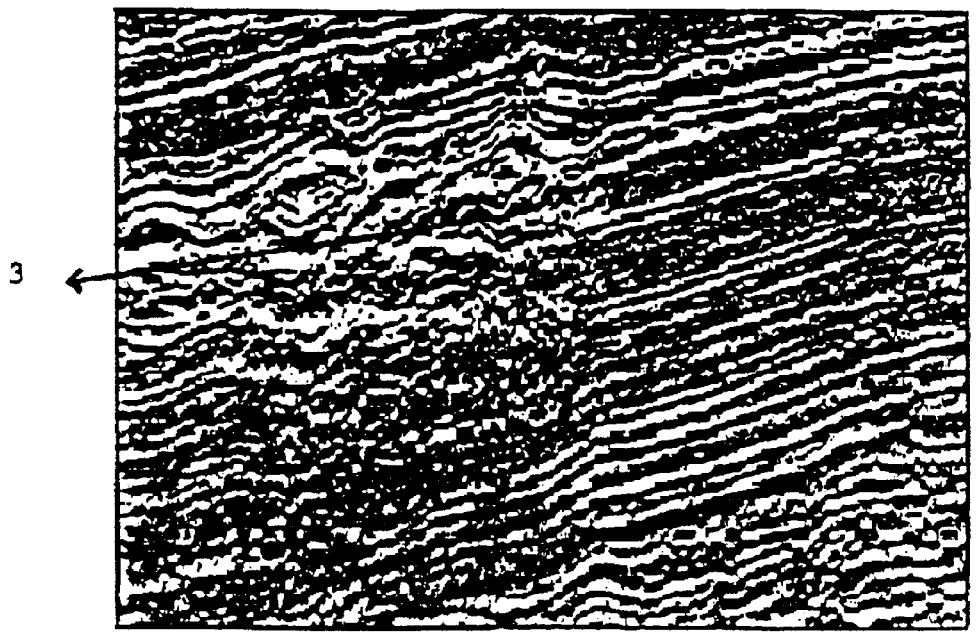
FIG. 2 represents a seismic image of the block of FIG. 1 and comprising the cross section through the plane of the image of a channel complex to be detected with the method according to the invention.

The method according to the invention, applied by way of example to the detection of channel complexes in seismic surveying, consists in constructing a seismic image block 1 representative of an explored medium. The block 1 comprises a sequence of seismic images 2 with axes x and y and arranged along a direction z orthogonal to the x and y axes. The sequence of images 2 represents the succession of seismic horizons present in the medium. A seismic image 2 of the block 1 is represented in FIG. 2. Interpretation of the block 1 seismic image 2 suggests the presence of a zone 3 of a channel complex which it is necessary to detect in the block 1 and to represent in a three-dimensional space. The other images 2 of the block 1 also comprise zones of the same channel complex 3.

A three-dimensional analysis window F is defined with axes parallel to the axes x, y and z of the block 1 and with dimensions N*N*N pixels which is centered on an image point PC of the block 1.

The components along the axes x, y and z of the light intensity gradient vector E are calculated at every point i of the said analysis window F. Next, the direct product $E \times E^T$ is calculated, $E^T$ being the transpose of the vector E. The result of this product is an elementary matrix M with three rows and three columns.

In another step, the elementary matrices M are summed for all the points i of the analysis window F in such a way as to obtain a sum matrix A which can be written in the form:

$$A = \begin{bmatrix} \sum_{i \in F} Ex_i^2 & \sum_{i \in F} Ex_i Ey_i & \sum_{i \in F} Ex_i Ez_i \\ \sum_{i \in F} Ex_i Ey_i & \sum_{i \in F} Ey_i^2 & \sum_{i \in F} Ey_i Ez_i \\ \sum_{i \in F} Ex_i Ez_i & \sum_{i \in F} Ey_i Ez_i & \sum_{i \in F} Ez_i^2 \end{bmatrix}$$

in which: $Ex_i$, $Ey_i$ and $Ez_i$ are the components of the gradient vector E along the x, y and z axes respectively at the point i.

An energy function J is defined by the relation:

$$J = \sum_{i \in F} (Ex_i u + Ey_i v + Ez_i w)^2 \tag{5}$$

in which u, v and w are the components of the optical flux U at the centre of the window F.

The energy J, in matrix form, can be written:

$$J = U^T A U = [u, v, w] \begin{bmatrix} \sum_{i \in F} Ex_i^2 & \sum_{i \in F} Ex_i Ey_i & \sum_{i \in F} Ex_i Ez_i \\ \sum_{i \in F} Ex_i Ey_i & \sum_{i \in F} Ey_i^2 & \sum_{i \in F} Ey_i Ez_i \\ \sum_{i \in F} Ex_i Ez_i & \sum_{i \in F} Ey_i Ez_i & \sum_{i \in F} Ez_i^2 \end{bmatrix} \begin{bmatrix} u \\ v \\ w \end{bmatrix} \tag{6}$$

in which:

$U^T$ is the transpose of the vector U,

A is the sum matrix.

The optical flux U sought in any direction of visualization, with unit vector D, must minimize the energy J under the constraint $U^T D = 1$, since the component of the vector U in the direction of visualization is unity.

By diagonalizing the central sum matrix A in the above expression, three eigenvalues $\lambda_1$, $\lambda_2$ and $\lambda_3$ and a base $V_P$ of eigenvectors are obtained. In this base $V_P$, the displacement vector or optical flux U is defined by $[U_1, U_2, U_3]^T$ and the direction of visualization is defined by $[X_1, X_2, X_3]^T$. As the component of the vector U in the direction of visualization is unity since it pertains to the inter-image distance, it follows that the constraint defined by the relation $U^T D = 1$ leads to the expression:

$$x_1 u_1 + x_2 u_2 + x_3 u_3 = 1 \tag{7}$$

In the base $V_P$, the energy J can be written:

$$J = [u_1, u_2, u_3] \begin{bmatrix} \lambda 1 & 0 & 0 \\ 0 & \lambda 2 & 0 \\ 0 & 0 & \lambda 3 \end{bmatrix} \begin{bmatrix} u1 \\ u2 \\ u3 \end{bmatrix} \tag{8}$$

Minimization of the energy J, for example by the least squares process and under the constraint $U^T D = 1$ is performed using a Lagrange operator α. This amounts to minimizing the following expression:

$$J = u_1^2 \lambda_1 + u_2^2 \lambda_2 + u_3^2 \lambda_3 + \alpha(x_1 u_1 + x_2 u_2 + x_3 u_3 - 1) \qquad (9)$$

Minimization therefore consists in setting the partial derivatives of J with respect to the unknowns $U_1$, $U_2$, $U_3$ and to zero and in solving the corresponding system which can be written:

$$\begin{cases} \frac{\partial J}{\partial \alpha} = x_1 u_1 + x_2 u_2 + x_3 u_3 - 1 = 0 \\ \frac{\partial J}{\partial u_1} = 2 u_1 \lambda_1 + \alpha x_1 = 0 \\ \frac{\partial J}{\partial u_2} = 2 u_1 \lambda_1 + \alpha x_1 = 0 \\ \frac{\partial J}{\partial u_3} = 2 u_3 \lambda_3 + \alpha x_3 = 0 \end{cases}$$

In this way and by replacing the variables $U_1$, $U_2$ and $U_3$ with expressions in terms of the eigenvalues )$\lambda_1$, $\lambda_2$ and $\lambda_3$, an expression for J which quantifies the flux error in the direction of visualization is obtained:

$$J = \frac{\lambda_1 \lambda_2 \lambda_3}{\lambda_2 \lambda_3 x_1^2 + \lambda_1 \lambda_3 x_2^2 + \lambda_1 \lambda_2 x_3^2} = \frac{1}{\frac{x_1^2}{\lambda_1} + \frac{x_2^2}{\lambda_2} + \frac{x_3^2}{\lambda_3}} \qquad (10)$$

The largest of the eigenvalues of the matrix A, for example $\lambda_1$, represents the variation in intensity in the direction of succession of the seismic horizons. The eigenvalue $\lambda_1$ is, therefore, as big if not bigger at the level of the horizons of high intensity as inside the channel complexes. Now, if the expression for J which quantifies the flux error in the direction of visualization is considered, it should be noted that the larger is $\lambda_1$, the more the flux error in the direction of visualization increases. Under these conditions, if the largest value $\lambda_1$, was taken into account, it would be found that the contrast in error between the channel complex and the remainder of the seismic survey would be strongly attenuated and it would, then be very difficult to detect the channel complex. According to the invention, the contribution of the largest of the eigenvalues is eliminated and the secondary flux error is calculated in directions in which the eigenvalue $\lambda_1$, no longer has any effect, that is to say in the directions such that $x_1$, which is the component of D on the principal axis defined by $\lambda_1$, is zero. Under these conditions and since D is a unit vector, it is possible to establish a relation between $X_2$ and $X_3$ of the type:

$$x_3^2 = 1 - x_2^2 \text{ with } x_1^2 + x_2^2 + x_3^2 = 1 \text{ and } x_1 = 0 \qquad (11)$$

Thus, under the condition $x_1 = 0$, the secondary flux error J' can be written in the form of a one-parameter function defined in the interval [−1, 1]:

$$J'(x_2) = \frac{\lambda_2 \lambda_3}{\lambda_3 x_2^2 + \lambda_2 (1 - x_2^2)} \qquad (12)$$

To define a multidirectional error, it is then necessary to integrate the secondary flux error in the plane defined by the eigenvectors corresponding to the remaining eigenvalues $\lambda_2$ and $\lambda_3$.

Specifically, given that $J'(x_2) = J'(-x_2)$, the calculation of the flux error in all directions such that $x_{=1}0$ is performed by solving the following integral:

$$SJ = 2 \int_0^1 \frac{\lambda_2 \lambda_3}{\lambda_3 x_2^2 + \lambda_2 (1 - x_2^2)} dx_2 \qquad (13)$$

The result of the integration leads to the following expression:

$$SJ = \lambda_3 \sqrt{\frac{\lambda_2}{\lambda_2 - \lambda_3}} \ln \left( \frac{1 + \sqrt{\frac{\lambda_2 - \lambda_3}{\lambda_2}}}{1 - \sqrt{\frac{\lambda_2 - \lambda_3}{\lambda_2}}} \right) \qquad (14)$$

The value of SJ represents the multidirectional flux error for the image point on which the analysis window is centred, its size being for example 5*5*5, that is to say comprising 125 pixels.

Thereafter, another image point $P_{C2}$ of the block 1 is chosen, the analysis window being centered on the said point $P_{C2}$. Next, and for this image point $P_{C2}$, the components of the light intensity gradient vector are calculated, from which are calculated the eigenvalues $\lambda'_1$, $\lambda'_2$ and $\lambda'_3$ of the sum matrix A. Once these eigenvalues have been calculated and after having eliminated the largest of these eigenvalues, $\lambda'_1$, for example, the formula SJ is applied by replacing the eigenvalues $\lambda_2$ and $\lambda_3$ by the new eigenvalues $\lambda'_2$ and $\lambda'_3$.

Gradually, each of the image points of the block 1 is analysed in the manner indicated above.

Figure 3:
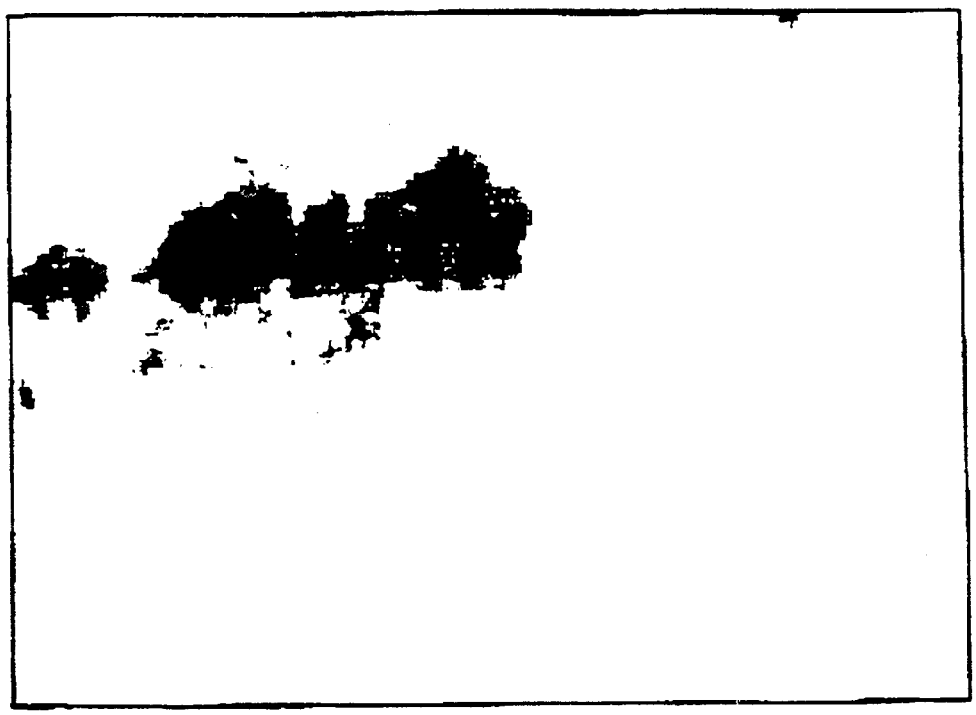
FIG. 3 represents the multidirectional flux error greater than a threshold and calculated from the image of FIG. 2.

So that the limits of the channel complex are properly delimited, the values of the multidirectional flux error SJ are thresheld so as to retain only the values which are greater than a threshold which can either be predetermined or be defined gradually until an appropriate threshold is found which corresponds to a significant difference between the multidirectional flux error corresponding to points situated outside the channel complex and the multidirectional flux error corresponding to points situated inside the channel complex. Represented in FIG. 3 is the threshold multidirectional error corresponding to the zone 3 of the channel of the image block which lies in the plane of the seismic image 2.

Figure 4:
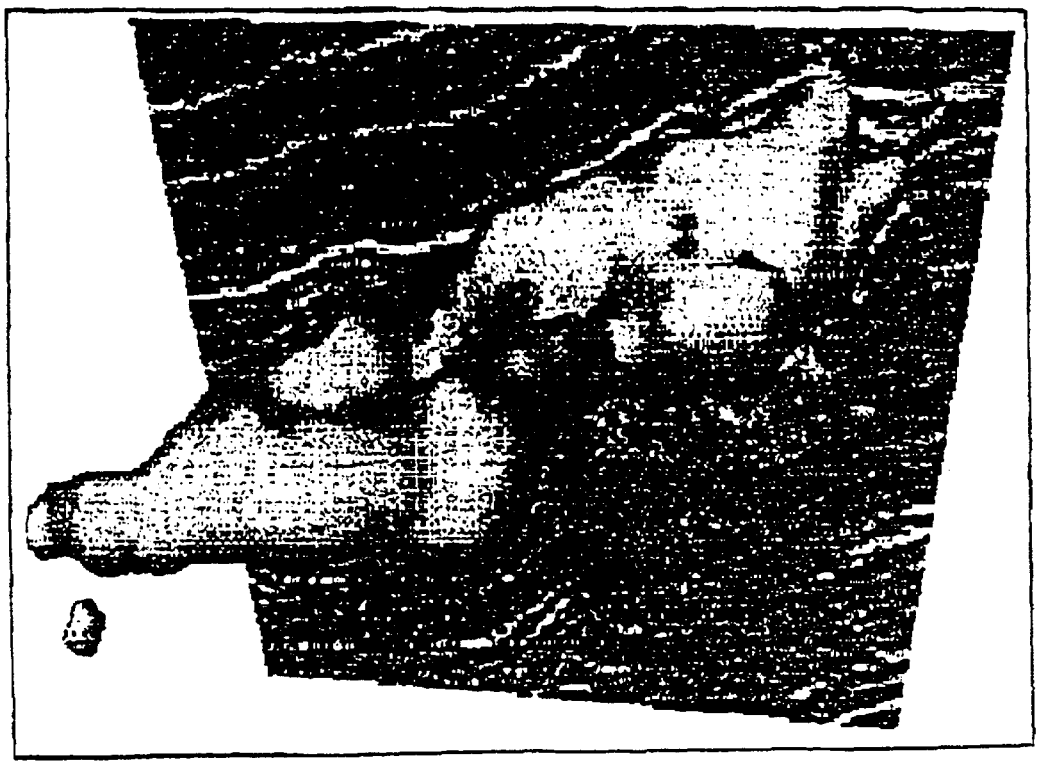
FIG. 4 is a 3D representation of the channel complex contained in the seismic image block of FIG. 1 after implementing the method according to the invention.

In a last step, the points retained are visualized in three dimensions so as to obtain a volume representing the channel complex, as is represented in FIG. 4.

What is claimed is:
1. Method of detecting chaotic structures in a given medium, of the type consisting in:
   a) representing the given medium by means of at least one sequence of images with axes x and y and arranged along a perpendicular axis z in such a way as to construct an image block with axes x, y and z,
   b) defining a three-dimensional analysis window F with axes parallel to the axes x, y and z,
   c) centering the window F on an image point of the block,
   d) calculating the components along the x, y and z axes of the light intensity gradient vector E at every point of the window F,
characterized in that it furthermore consists in:
   e) calculating an elementary matrix M at every point of the window F and representing the direct product $E \times E^T$ where $E^T$ is the transpose of the gradient vector E,
   f) summing the elementary matrices M for all the points of the window F, in such a way as to obtain a sum matrix A which is assigned to the said image point on which the window is centered,
   g) diagonalizing the said sum matrix A so as to determine its eigenvalues $\lambda_1$, $\lambda_2$, $\lambda_3$, each eigenvalue corresponding to an eigenvector, h) quantifying, at the image point, centre of the window, the minimum global error in the optical flux vector U in an oriented direction with unit vector D, as a function of the said eigenvalues $\lambda_1$, $\lambda_2$ and $\lambda_3$ with the constraint $U^T \times D = 1$ where $U^T$ is the transpose of the vector U, i) eliminating the contribution of the largest eigenvalue in the quantification of the error in the optical flux in such a way as to obtain a quantification of a secondary error in the optical flux as a function of the two remaining eigenvalues for the said oriented direction;

j) defining a multidirectional error by integrating the secondary error in the plane defined by the eigenvectors corresponding to the remaining eigenvalues, k) assigning the multidirectional error to the image point on which the window F is centered, and l) calculating the multidirectional errors assigned to all the image points of the image block.

2. Method according to claim 1, characterized in that the multidirectional error assigned to an image point is given by the formula:

$$SJ = \lambda_3 \sqrt{\frac{\lambda_2}{\lambda_2 - \lambda_3}} \ln \left( \frac{1 + \sqrt{\frac{\lambda_2 - \lambda_3}{\lambda_2}}}{1 - \sqrt{\frac{\lambda_2 - \lambda_3}{\lambda_2}}} \right) \quad (14)$$

in winch $\lambda_2$ and $\lambda_3$ are the smallest eigenvalues of the diagonalized matrix corresponding to the said image point.

3. Method according to claim 2, characterized in that steps c) to g) yielding the eigenvalues of the diagonalized matrix are performed for each image point, and the formula for calculating the multidirectional error is applied after having eliminated the largest of the eigenvalues.

4. Method according to claim 1, characterized in that each multidirectional flux error is thresheld as a function of a threshold which is predetermined or computed by successive approximations.

5. Method according to claims 1, characterized in that it is applied to a block made up of a sequence of seismic images so as to detect channel complexes.

* * * * *